UNITED STATES PATENT OFFICE 2,552,539

DIAMIDOTHIOPHOSPHATES

Lewis R. Drake, Midland, Mich., assignor to The Dow Chemical Company, Midland, Mich., a corporation of Delaware No Drawing. Application April 15, 1949,
Serial No. 87,845

4 Claims. (Cl. 260—461)

This invention is directed to the diamidothiophosphates having the formula

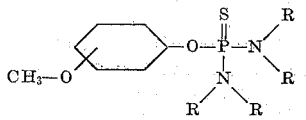

wherein each R symbol is an alkyl radical or hydrogen.

These new products may be prepared by reacting an O-(methoxyphenyl) dichlorothiophosphate having the formula

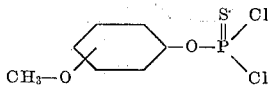

with ammonia, or an alkyl amine, or successively with two different alkyl amines, or with an alkyl amine and ammonia.

Where it is desired to introduce two identical alkyl amine groups into the molecule, a minimum of 2 molecular proportions of the amine is dissolved in at least 2 molecular proportions of pyridine and the resulting solution reacted with 1 molecular proportion of the O-(methoxyphenyl) dichlorothiophosphate. The latter reactant may be dissolved in benzene or other suitable solvent. The reaction is carried out with stirring and at a temperature of from about 20° to 78° C. Where it is desired that the substituting amine groups differ, 1 molecular proportion of each appropriate amine compound separately dissolved in at least 1 molecular proportion of pyridine is successively added portionwise to 1 molecular proportion of the O-(methoxyphenyl) dichlorothiophosphate. Such additions are carried out under the usual reaction conditions.

When only one chlorine of the dichlorothiophosphate product is to be replaced by an alkyl amine group, 1 molecular proportion of the amine is added portionwise with stirring to an equimolecular proportion of the O-(methoxyphenyl) dichlorothiophosphate, and the resulting intermediate product reacted with an excess of ammonia. The conditions of reaction and reaction solvents are as previously set forth. If desired, by-product pyridine hydrochlorine may be separated from such intermediate product prior to reaction with the ammonia.

If both chlorines of the dichlorothiophosphate product are to be replaced by —NH$_2$ groups, the O-(methoxyphenyl) dichlorothiophosphate is reacted with an excess of ammonia. This is accomplished either by adding the former to an excess of liquid ammonia or by exhaustively passing anhydrous gaseous ammonia through the dichlorothiophosphate dissolved in benzene or other solvent. In either event, large excesses of ammonia are employed.

The crude diamidothiophosphate products as obtained in the practice of the foregoing reactions have utility without further modification as constituents of parasiticidal mixtures. However, some purification is frequently desirable. In one such operation, the crude reaction mixture is filtered to separate pyridine hydrochloride and ammonium hydrochloride. The product is then successively treated with alkali, acid and water, to separate traces of reactants and by-product hydrochlorides.

The O-(methoxyphenyl) dichlorothiophosphates employed as starting materials, as above described, may be prepared by several methods. One such procedure includes reacting a 2-, 3- or 4-methoxyphenol with phosphorus trichloride (PCl$_3$) in the presence of magnesium chloride, as catalyst, to produce an O-(methoxyphenyl) dichlorophosphite intermediate of the formula

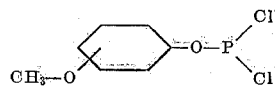

This intermediate is then reacted with sulphur at elevated temperatures. In carrying out the above reaction, 7 molecular proportions of phosphorus trichloride, 1 molecular proportion of the methoxyphenol and 0.01 molecular proportion of magnesium chloride are mixed together and heated at the boiling temperature of phosphorus trichloride (76° to 82° C.) and under reflux. Upon completion of the reaction as noted by the cessation of hydrogen chloride evolution, excess phosphorus trichloride is stripped from the reaction zone by fractional distillation under reduced pressure, and 1 molecular proportion of sulphur added to the residual mixture. The latter is warmed at 150° to 170° C. for about ½ hour to accomplish the dispersion of the sulphur. The temperature of the reaction mixture is then gradually raised until an exothermic reaction is initiated between the O-(methoxyphenyl) dichlorophosphite and sulphur, whereupon the pot temperature rapidly rises to about 240° C. Upon completion of the reaction, the crude mixture is fractionally distilled under reduced pressure to obtain the desired O-(methoxyphenyl) dichlorothiophosphate.

In an alternative method, the starting materials may be prepared by reacting substantially equimolecular proportions of a 2-, 3- or 4-methoxyphenol with thiophosphoryl chloride in a molecular excess of pyridine. The reaction is somewhat exothermic and takes place at a temperature of from 30° to 100° C. In carrying out the reaction, the methoxyphenol is dissolved in pyridine and the resulting solution added portionwise and with stirring to the thiophosphoryl chloride. A mixture of pyridine and an inert solvent such as benzene may be substituted for the excess pyridine, provided only that at least one molecular proportion of pyridine be present for each molecular proportion of methoxyphenol in the ultimate solution. Upon completion of the reaction, by-product pyridine hydrochloride may be separated from the reaction mixture by filtration to obtain the desired crude starting material.

The diamidothiophosphates of the present invention are oils or crystalline solids, substantially insoluble in water, somewhat soluble in many organic solvents, and non-corrosive to the skin of man and higher animals. They are of value as toxic constituents of insecticidal and fungicidal compositions.

The following examples illustrate the invention but are not to be construed as limiting.

*Example 1.—O-(2-methoxyphenyl) diamidothiophosphate*

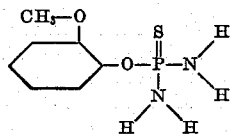

12.6 grams (0.05 mole) of a O-(2-methoxyphenyl) dichlorothiophosphate (having a boiling point of 131° to 132° C. at 1.5 millimeters pressure, a density of 1.405 at 25° C. and a refractive index n/D of 1.5692 at 35° C.) was added to 50 milliliters of liquid ammonia and the excess ammonia evaporated off over a period of 16 hours at room temperature. The crude reaction mixture was then washed with water to separate ammonium chloride and the resulting mixture filtered to obtain an O-(2-methoxyphenyl) diamidothiophosphate product as a white crystalline solid. Following recrystallization from methanol, this product was found to melt at 149° to 150° C. and to have a nitrogen content of 12.44 per cent. The theoretical nitrogen content for $C_7H_{11}N_2O_2PS$ is 12.8 per cent.

*Example 2.—O-(3-methoxyphenyl) diamidothiophosphate*

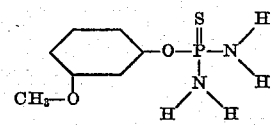

In a similar mannner, 12.6 grams (0.05 mole) of O-(3-methoxyphenyl) dichlorothiophosphate (having a boiling point of 131° to 132° C. at 4 millimeters pressure, a density of 1.40 at 27° C. and a refractive index of 1.5709 at 35° C.) was reacted with 50 milliliters of liquid ammonia. The excess ammonia was evaporated off over a period of 16 hours at room temperature, and the resulting mixture processed as described in Example 1 to obtain an O-(3-methoxyphenyl) diamidothiophosphate product as a white crystalline solid melting at 87° to 88° C. and having a nitrogen content of 12.66 per cent. The nitrogen content of $C_7H_{11}N_2O_2PS$ is 12.8 per cent.

*Example 3.—O-(4-methoxyphenyl) diamidothiophosphate*

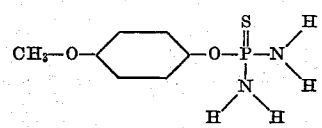

12.4 grams (0.1 mole) of 4-methoxyphenol was dissolved in 50 milliters of pyridine. This solution was then added portionwise at room temperature to 17 grams (0.1 mole) of thiophosphoryl chloride to produce an O-(4-methoxyphenyl) dichlorothiophosphate starting material. The addition was carried out with stirring and the resulting solution set aside for 16 hours to permit completion of the reaction. Pyridine hydrochloride was then separated from the reaction mixture by filtration to obtain the desired starting material as an oily residue. The latter was added to 50 milliliters of liquid ammonia and the excess ammonia evaporated off over a period of 16 hours at room temperature. The crude reaction mixture was then processed as described in Example 1 to obtain an O-(4-methoxyphenyl) diamidothiophosphate product as a crystalline solid melting at 120° to 123° C.

*Example 4.—O-(4-methoxyphenyl) N,N-diethyl-diamidothiophosphate*

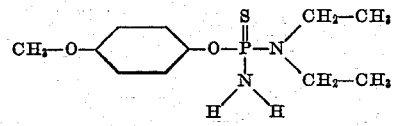

3.6 grams (0.05 mole) of diethylamine was dissolved in 3.9 grams (0.05 mole) of pyridine and added portionwise with stirring to 12.6 grams (0.05 mole) of O-(4-methoxyphenyl) dichlorothiophosphate dissolved in 50 milliliters of benzene and at 25° C. During the reaction, the temperature rose 20° C. and the resulting mixture was set aside for 16 hours. This intermediate product was then poured into 50 milliliters of liquid ammonia. The excess ammonia was evaporated off over a period of 16 hours at room temperature and the crude reaction mixture filtered to separate pyridine hydrochloride and ammonium chloride. The filtrate was successively washed with dilute aqueous sodium hydroxide, dilute aqueous hydrochloric acid and water, and dried with anhydrous sodium sulphate. The benzene was then removed by evaporation to obtain an O-(4-methoxyphenyl) N,N - diethyldiamidothiophosphate product as a crystalline solid melting at 122° to 124° C.

*Example 5.—O-(2 - methoxyphenyl) N - normal-butyldiamidothiophosphate*

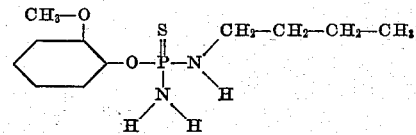

3.65 grams (0.05 mole) of normalbutylamine was dissolved in 3.9 grams (0.05 mole) of pyridine and added portionwise with stirring to 12.6 grams (0.05 mole) of O-(2-methoxyphenyl) dichlorothiophosphate dissolved in 50 milliliters of benzene as described in Example 4. The temperature of the reaction mixture rose 29° C. during the reaction. This intermediate product was then poured into 50 milliliters of liquid ammonia, the excess ammonia was evaporated off, and the crude reaction mixture filtered to separate hydrochloride by-products. The filtrate was then successively washed with dilute aqueous sodium hydroxide, dilute aqueous hydrochloric acid and water, and dried with anhydrous sodium sulphate. Benzene was removed from the mixture by evaporation to obtain an O-(2-methoxyphenyl) N-normalbutyldiamidothiophosphate product as a yellow oil having a density of 1.32 at 23° C., a refractive index n/D of 1.5535 at 35° C., and a nitrogen content of 10.09 per cent. The theoretical nitrogen content for $C_{11}H_{19}N_2O_2PS$ is 10.2 per cent.

*Example 6.—O-(3-methoxyphenyl) N,N'-diethyl-diamidothiophosphate*

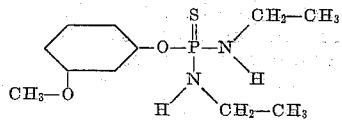

4.5 grams (0.1 mole) of ethylamine was dissolved in 7.9 grams (0.1 mole) of pyridine and added portionwise with stirring to 12.6 grams (0.05 mole) of O-(3-methoxyphenyl) dichlorothiophosphate dissolved in 50 milliliters of benzene as previously described. The temperature rose 55° C. during the reaction. Pyridine hydrochloride was then removed from the mixture by filtration, and the filtrate successively washed with dilute aqueous sodium hydroxide, dilute aqueous hydrochloric acid and water, and dried with anhydrous sodium sulfate. The benzene was then removed by evaporation to obtain an O-(3 - methoxyphenyl) N,N'-diethyldiamidothiophosphate product as a white crystalline solid melting at 75° to 75.5° C. and having a nitrogen content of 10.13 per cent. The theoretical nitrogen content for $C_{11}H_{19}N_2O_2PS$ is 10.2 per cent.

*Example 7.—O-(4-methoxyphenyl) N,N'-diethyl-diamidothiophosphate*

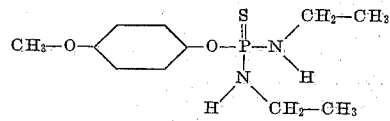

In a similar fashion, 0.1 mole quantities of ethyl amine and pyridine and 0.5 mole of O-(4-methoxyphenyl) dichlorothiophosphate were reacted together in 50 milliliters of benzene to obtain an O-(4 - methoxyphenyl) N,N'-diethyldiamidothiophosphate product as a light yellow oil having a density of 1.513 at 23° C. and a refractive index n/D of 1.5654 at 35° C.

*Example 8.—O-(3-methoxyphenyl) N,N,N',N'-tetramethyldiamidothiophosphate*

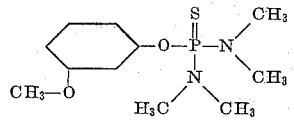

4.5 grams (0.1 mole) of dimethyl amine, 7.9 grams (0.1 mole) of pyridine and 12.6 grams (0.05 mole) of O-(3-methoxyphenyl) dichlorothiophosphate were reacted together in 50 milliliters of benzene as described in Example 6. The crude reaction mixture was then processed in the usual fashion to obtain an O-(3-methoxyphenyl) N, N, N', N' - tetramethylidiamidothiophosphate product as a light yellow oil having a density of 1.275 at 23° C., a refractive index n/D of 1.5420 at 35° C. and a nitrogen content of 10.19 per cent.

The theoretical nitrogen content for $C_{11}H_{19}N_2O_2PS$ is 10.2 per cent.

*Example 9.—O-(4-methoxyphenyl) N-methyl N'-normalbutyldiamidothiophosphate*

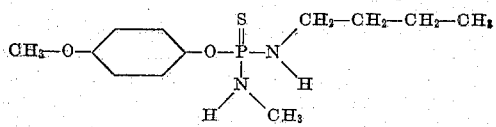

3.65 grams (0.05 mole) of normalbutylamine was dissolved in 3.9 grams (0.05 mole) of pyridine and added portionwise with stirring to 12.6 grams (0.05 mole) of O-(4-methoxyphenyl) dichlorothiophosphate dissolved in 50 milliliters of benzene and at room temperature. The temperature of the reaction mixture rose 30° C. during the addition, and the resulting mixture was set aside for 16 hours. 1.5 grams (0.05 mole) of methylamine dissolved in 3.9 grams (0.05 mole) of pyridine was then added portionwise to the above intermediate product with stirring. The latter addition was carried out with a 58° C. temperature rise, and the resulting mixture thereafter allowed to stand at room temperature for over night. Pyridine hydrochloride was then separated by filtration and the filtrate processed in the usual manner to obtain an O-(4-methoxyphenyl) N-methyl N'-normalbutyldiamidothiophosphate product as a light yellow oil. The latter had a density of 1.308 at 23° C. and a refractive index n/D of 1.5501 at 35° C.

*Example 10.—O-(4-methoxyphenyl) N,N-diethyl N'-normalbutyldiamidothiophosphate*

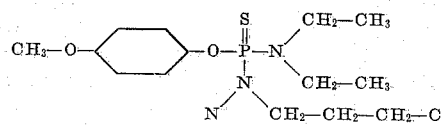

0.05 mole of O-(4-methoxyphenyl) dichlorothiophosphate in 50 milliliters of benzene was successively reacted with normalbutylamine and diethylamine in pyridine as described in Example 9. The crude reaction product was processed in the usual manner to obtain an O-(4-methoxyphenyl) N,N-diethyl N'-normalbutyldiamidothiophosphate product as a light yellow oil having a density of 1.43 at 23° C. and a refractive index n/D of 1.5552 at 35° C.

*Example 11.—O-(2-methoxyphenyl) N,N-diethyl N'-normalbutyldiamidothiophosphate*

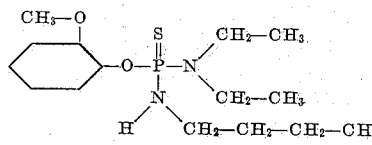

In a similar manner, 0.039 mole quantities O-(2-methoxyphenyl) dichlorothiophosphate, normalbutylamine, and diethylamine and 0.078 mole of pyridine were reacted to obtain an O-(2-methoxyphenyl) N,N-diethyl N'-normalbutyldiamidothiophosphate product as a viscous tan oil. The latter had a density of 1.728 at 25° C. and a refractive index n/D of 1.5445 at 35° C.

*Example 12.—O-(2-methoxyphenyl) N,N-diethyl N',N'-dimethyldiamidothiophosphate*

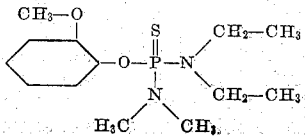

3.6 grams (0.05 mole) of diethylamine was dissolved in 3.9 grams (0.05 mole) of pyridine and added portionwise with stirring to 12.6 grams (0.05 mole) of O-(2-methoxyphenyl) dichlorothiophosphate dissolved in 50 milliliters of benzene at room temperature. During the addition, the temperature rose 45° C., and the resulting mixture was set aside for 16 hours to permit completion of the reaction. 2.2 grams (0.05 mole) of dimethylamine dissolved in 3.9 grams (0.05 mole) of pyridine was then reacted with the above intermediate product in the usual manner. Pyridine hydrochloride was separated from the resulting crude product and the residue processed in the usual fashion to obtain an O-(2-methoxyphenyl N,N-diethyl N',N'-dimethyldiamidothiophosphate product as a light yellow oil having a density of 1.325 at 23° C. and a refractive index n/D of 1.5418 at 35° C.

*Example 13.—O-(4-methoxyphenyl) N,N,N',N',-tetraethyldiamidothiophosphate*

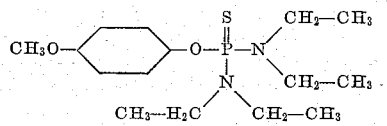

7.2 grams (0.1 mole) of diethylamine was dissolved in 7.8 grams (0.1 mole) of pyridine and added portionwise with stirring to 12.6 grams (0.05 mole) of O-(4-methoxyphenyl) dichlorothiophosphate dissolved in 50 milliliters of benzene and the resulting mixture set aside for 16 hours to permit completion of the reaction. The crude reaction product was then processed in the usual manner to obtain an O-(4-methoxyphenyl) N,N,N',N'-tetraethyldiamidothiophosphate product as a viscous yellow oil having a density of 1.74 at 23° C. and a refractive index n/D of 1.5550 at 35° C.

*Example 14.—O-(3-methoxyphenyl) N,N,N',N'-tetraethyldiamidothiophosphate*

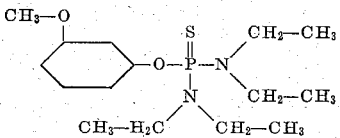

In a similar manner, 0.1 mole quantities of diethylamine and pyridine and 0.5 mole of O-(3-methoxyphenyl) dichlorothiophosphate were reacted together in 50 milliliters of benzene to obtain an O-(3-methoxyphenyl)-N,N,N',N'-tetraethyldiamidothiophosphate product as a viscous yellow oil having a density of 1.735 at 23° C. and a refractive index n/D of 1.5720 at 35° C.

*Example 15.—O-(3-methoxyphenyl) N,N'-dinormalbutyl-diamidothiophosphate*

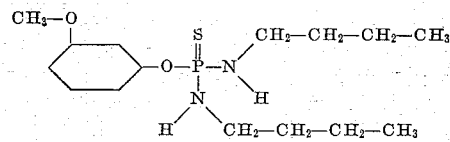

7.3 grams (0.1 mole) of normalbutylamine was dissolved in 7.8 grams (0.1 mole) of pyridine and added portionwise with stirring to 12.6 grams (0.05 mole) of O-(3-methoxyphenyl) dichlorothiophosphate dissolved in 50 milliliters of benzene and the resulting mixture set aside for 16 hours to permit completion of the reaction. The crude reaction product was then processed in the usual fashion to obtain an O-(3-methoxyphenyl) N,N'-dinormalbutyldiamidothiophosphate product as a viscous tan oil having a density of 1.74 at 25° C. and a refractive index n/D of 1.5686 at 35° C.

*Example 16.—O-(2-methoxyphenyl) N,N-diethyl N'-normaldodecyldiamidothiophosphate*

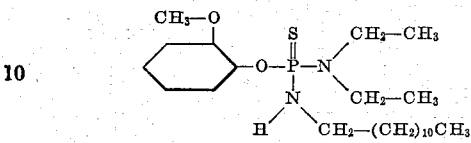

9.25 grams (0.05 mole) of normaldodecylamine was dissolved in 3.9 grams (0.05 mole) of pyridine and added portionwise with stirring to 12.6 grams (0.05 mole) of O - (2 - methoxyphenyl) dichlorothiophosphate dissolved in 50 milliliters of benzene and at room temperature. During the addition, the temperature rose 31° C. and the resulting mixture was set aside for 16 hours to permit completion of the reaction. 3.6 grams (0.05 mole) of diethylamine, dissolved in 3.9 grams (0.05 mole) of pyridine was then reacted with the above intermediate product in the usual fashion. Pyridine hydrochloride was separated from the resulting crude product and the residue processed as previously described to obtain an O-(2-methoxyphenyl) N,N-diethyl N'-normaldodecyldiamidothiophosphate product as a yellow oil having a density of 1.242 at 23° C. and a refractive index n/D of 1.5215 at 35° C.

In a similar manner, other O-methoxyphenyl-diamidothiophosphates may be prepared of which the following are representative.

O-(4-methoxyphenyl) N,N-dinormalbutyl N'-normaloctyldiamidothiophosphate by reacting O-(4 - methoxyphenyl) dichlorothiophosphate, dinormalbutylamine, normaloctylamine and pyridine.

O-(2-methoxyphenyl) N-normalhexyl N',N'-dinormaldodecyldiamidothiophosphate by reacting O-(2-methoxyphenyl) dichlorothiophosphate, normalhexylamine, dinormaldodecylamine and pyridine.

O-(3-methoxyphenyl) N,N,N',N'-tetranormalbutyldiamidothiophosphate by reacting O-(3-methoxyphenyl) dichlorothiophosphate, dinormalbutylamine and pyridine.

O - (2 - methoxyphenyl) N - secondarybutyl N-normaloctyldiamidothiophosphate by reacting O-(2-methoxyphenyl) dichlorothiophosphate, secondary butylamine, normaloctylamine and pyridine.

The new diamidothiophosphate products have been tested and found effective as insecticides and fungicides. They may be applied to growing vegetation in amounts required for insect control with negligible injury to plant foliage. For such insecticidal use, the products may be dispersed on finely-divided inert solids and employed as dusts. Also, such mixtures may be dispersed in water with the aid of a wetting agent and the resulting aqueous suspension employed as sprays. In other procedures, the products may be employed in oils, as constituents of oil in water emulsions, or in water dispersions with or without the addition of wetting, dispersing or emulsifying agents.

The products of the preceding examples have been tested for the control of two-spotted spider mites, bean aphids and Mexican bean beetles. In representative operations against such organisms, 100 per controls have been obtained with aqueous spray compositions containing from 0.5 to 3 pounds of the toxicant per 100 gallons of spray mixture.

I claim:
1. A diamidothiophosphate having the formula

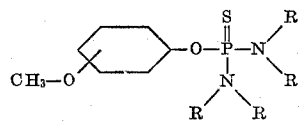

wherein each R symbol represents a member of the group consisting of the alkyl radicals and hydrogen.

2. O-4-methoxyphenyl N,N-diethyldiamidothiophosphate.

3. O-4-methoxyphenyl N,N'-diethyldiamidothiophosphate.

4. O-2-methoxyphenyl N,N-dimethyl N',N'-diethyldiamidothiophosphate.

LEWIS R. DRAKE.

REFERENCES CITED

The following references are of record in the file of this patent:

UNITED STATES PATENTS

| Number | Name | Date |
|---|---|---|
| 2,299,535 | Dickey | Oct. 20, 1942 |

FOREIGN PATENTS

| Number | Country | Date |
|---|---|---|
| 500,386 | Great Britain | Feb. 8, 1939 |